Dec. 31, 1940.  R. I. MARKEY  2,226,936
EXHAUST MANIFOLD SYSTEM
Filed Sept. 27, 1939   2 Sheets-Sheet 1
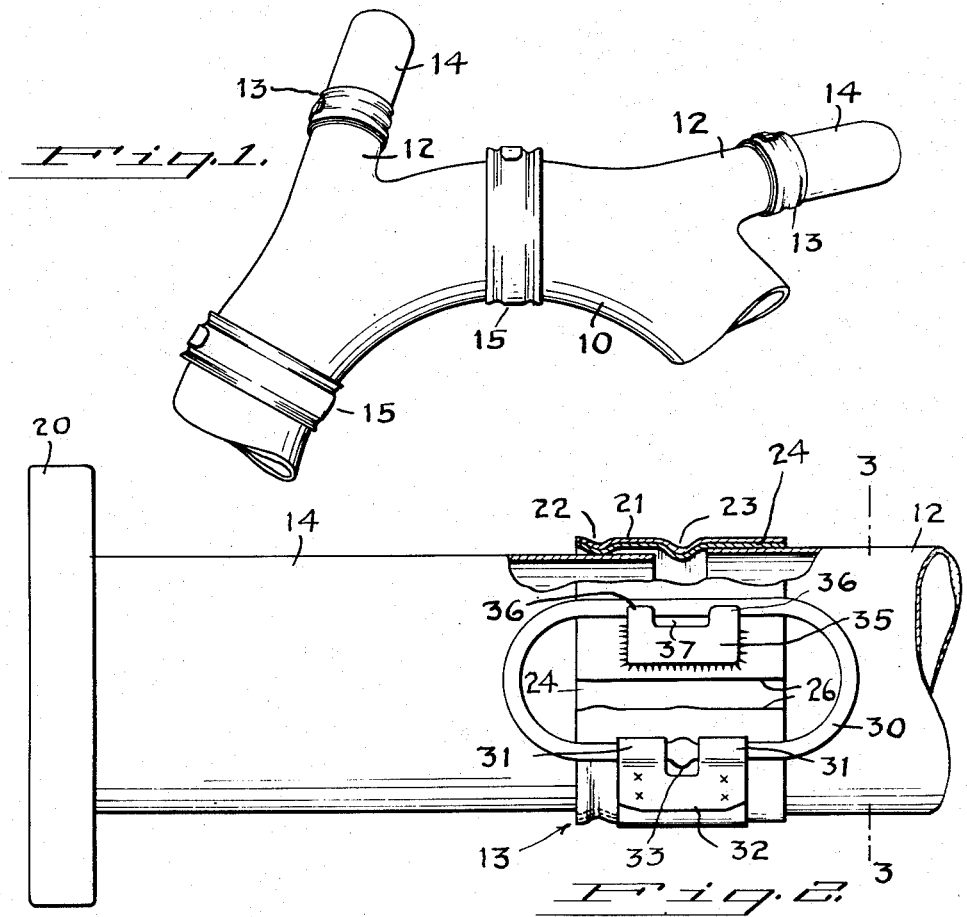
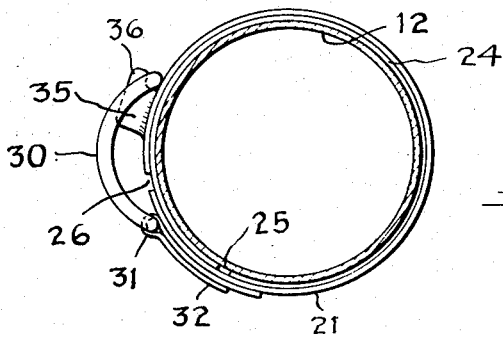
INVENTOR.
Roscoe I. Markey
BY
ATTORNEY.

Dec. 31, 1940.  R. I. MARKEY  2,226,936
EXHAUST MANIFOLD SYSTEM
Filed Sept. 27, 1939  2 Sheets-Sheet 2
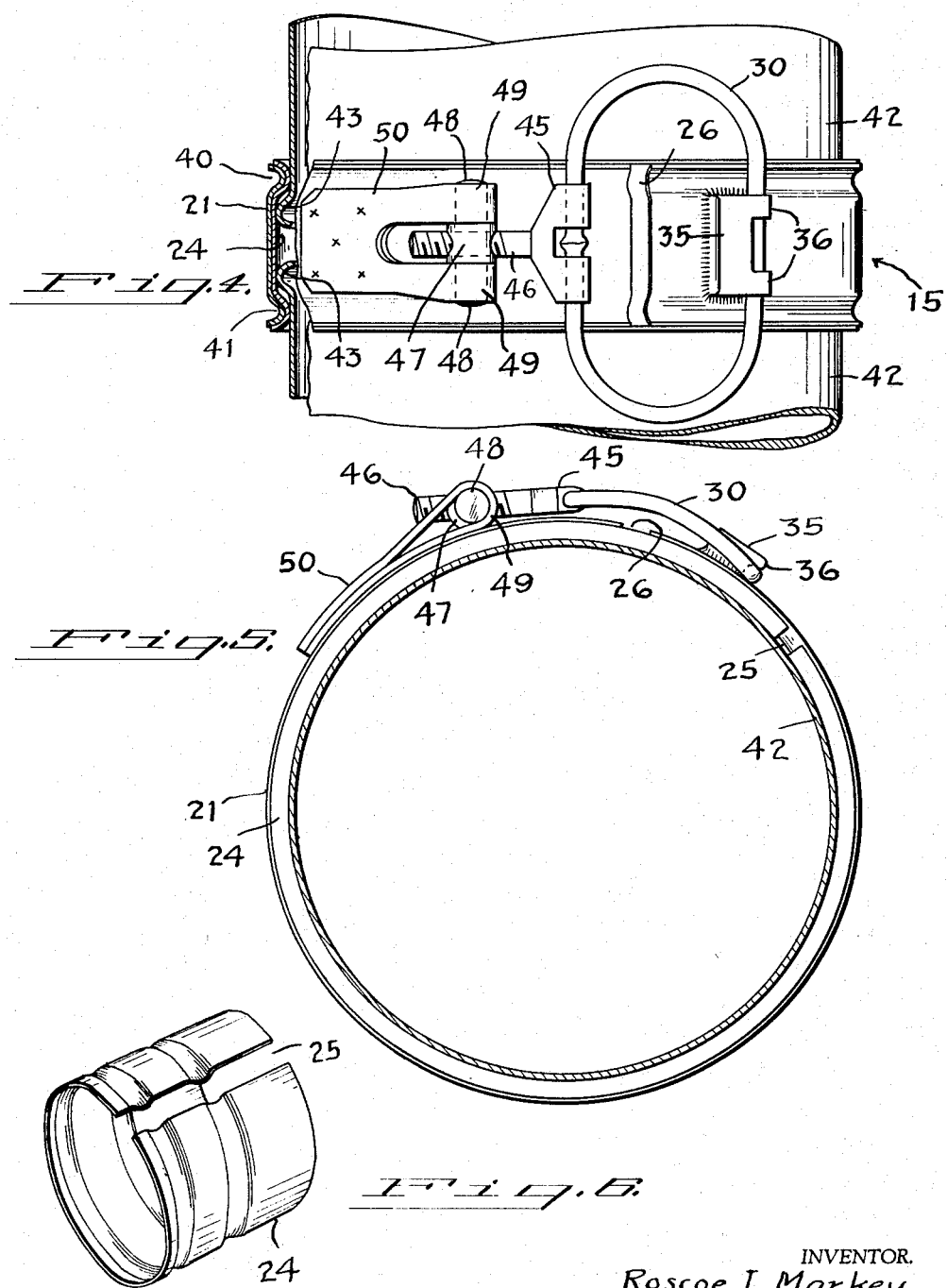
INVENTOR.
Roscoe I. Markey
BY
ATTORNEY.

Patented Dec. 31, 1940

2,226,936

UNITED STATES PATENT OFFICE 2,226,936

EXHAUST MANIFOLD SYSTEM

Roscoe I. Markey, East Orange, N. J., assignor to Pollak Manufacturing Company, Arlington, N. J., a corporation of New Jersey Application September 27, 1939, Serial No. 296,799

9 Claims. (Cl. 285—193)

The invention relates to exhaust manifold systems and particularly to joints or connections adapted for use in exhaust manifold systems for aircraft engines.

The exhaust manifold or collector system for what is known as a radial-type engine comprises a hollow annular member having a plurality of branch pipes leading to the engine cylinders and a tail or outlet pipe leading from the hollow annular member to atmosphere. The manifold system is placed in close proximity to the engine and there is considerable expansion and contraction in the entire system due to the great heat developed by the engine while in operation. It is therefore impossible or highly impractical to provide rigid connections between the parts. The branch pipes, the outlet pipe and oftimes the hollow annular member itself must be provided with joints which will positively hold the parts together and yet at the same time be sufficiently flexible to compensate for the changes in dimensions due to expansion and contraction caused by heating and cooling.

The principal object of the present invention is to provide a joint that will efficiently serve in such exhaust manifold systems.

Another object of the invention is to provide a joint of this character which is extremely simple in construction thus lending itself to economy of manufacture and ease of installation.

In the manufacture of exhaust manifolds to which the invention relates welding is largely employed. Oftimes the parts will not be positioned with a great deal of precision. One of the important advantages of the invention is that the flexibility of the joint readily compensates for reasonably slight inaccuracies, thus greatly facilitating the installation of the system and renewal of worn parts. In other words a system is provided which guarantees practically 100% interchangeability. While radial-type engines have been particularly spoken about it will be obvious the joint is just as applicable to exhaust manifolds for engines having their cylinders in line or other types of engines.

Other objects and advantages will appear as this specification proceeds. Referring to the drawings forming a part thereof and in which preferred embodiments of the invention are illustrated:

Fig. 1 is a fragmentary elevational view showing the joint or clamp in an exhaust manifold;

Fig. 2 is a side elevation with parts in section illustrating a type of clamp that is adaptable for use in branch pipes leading from the manifold or collector ring to the exhaust opening of the engine cylinder;

Fig. 3 is a cross-sectional view taken on line 3—3 of Fig. 2;

Fig. 4 is an elevational view of a slightly different arrangement of clamp that might be used in fastening sections of the manifold together or for a tail pipe;

Fig. 5 is an end view of the clamp shown in Fig. 4; and

Fig. 6 is a perspective view of a liner used in the clamp.

Referring again to said drawings, the reference numeral 10 designates a fragmentary portion of the annular collector ring or manifold of an exhaust manifold system. Branch pipes are indicated at 12 and there may be any number of these branch pipes, depending upon the number of cylinders in the engine. A tail pipe or outlet pipe leading to atmosphere is also employed, but as this pipe is similar to the branch pipes, except generally being of larger diameter, it is not illustrated.

The branch pipes or tail pipe comprise sections 12 welded to or formed integral with the annular collector ring and clamps 13 secure the sections 12 to other sections 14 which lead to the exhaust outlets of the cylinders. Other clamps 15 may be utilized to secure sections of the collector ring together and clamps similar to the ones indicated at 15 may be utilized to secure sections of the tail pipe together.

The clamps 13 as will be hereinafter apparent permit of axial movement of the sections 12 and 14 and a slight angular movement of one of the sections in relation to the other. The clamp 15 permits of angular movement of either of the sections in relation to each other and also of axial movement of either of the sections in relation to each other but limits the amount of axial movement. In other words the clamp 15 prevents the sections from pulling apart or separating.

Referring particularly to the clamp 13 illustrated in Figs. 1, 2 and 3 the pipe section 14 enters a flange 20 which is suitably secured to the exhaust outlet of the engine cylinder. The connection between the pipe 14 and flange 20 may permit of axial and angular movement of the pipe 14 but the details of this connection form no part of the present invention.

The opposite end of the pipe 14 enters the clamp proper which comprises a split clamping member 21 having a pair of circumferential corrugations 22 and 23. The split clamping member is provided with a liner 24 which comprises an annular split band having corrugations identical with those in the split clamping member. This liner is of particular importance. It strengthens the clamp, and the opening or gap 25 in the liner is spaced away from the opening or gap 26 in the clamping member thus insuring against the escape of gases from the space between the two sections to be connected. One of the most important advantages is that it provides a member to take up wear. The liner is inexpensive and easily renewable when worn and thus the life of the clamping member proper is greatly prolonged.

It will be noted the corrugation 22 snugly engages the smooth exterior surface of the pipe section 14. A joint is thus made which is substantially tight but permits of axial movement and a slight angular movement of the section 14 in relation to the clamp or to the section mounted in the opposite side of the clamp.

The corrugation 23 is located centrally of the clamp and rests between the adjacent ends of the sections 12 and 14 and acts primarily as a means for preventing the clamp from being moved from its proper position.

As illustrated the branch tube section 12 simply has a sliding engagement with the clamp thus permitting only of axial movement. Obviously, if desired, a similar corrugation to that shown at 22 might be utilized in connection with the branch tube 12.

Means are provided for firmly securing the ends of the split clamping member together, this means having particularly in mind to permit of diametrical expansion and contraction of the clamping member to compensate for such changes due to expansion and contraction in the sections to be coupled together.

A locking member 30 of elongated ring-like formation is pivoted in a pair of ears 31 forming part of a plate 32 which is welded or otherwise secured to the split clamping member adjacent the gap 26. The locking member has its ends swaged between the ears 31 as indicated at 33 to prevent longitudinal displacement thereof.

On the side of the gap 26 opposite to where the locking member is hinged is welded or otherwise secured a block 35. Formed integral with and projecting from either end of said block is a pair of ears 36, 36. The locking member 30 is sprung under these ears 36 and the clamp is then locked in position. Due to the shape and resiliency of the locking member 30 the split clamping ring may readily expand or contract and yet at all times be firmly and rigidly locked in position.

The shape of the block 35 and its locking ears 36 permit of a suitable tool being applied to lock or unlock the clamp. This tool has a curved end and in locking the clamp it is slipped under the ring and into the opening 37 between the ears. The ring then readily rides over it into its locked position. In opening the clamp the tool is reversed and the ring is easily and quickly moved from under the ears to its released position.

The clamp just described is particularly adapted to couple the ends of two sections together whose opposite ends are more or less fixed, for instance, the branch tube of an exhaust collector ring and the section leading from the exhaust opening of an engine cylinder. Ample provision is made for stresses and strains caused by expansion and contraction in heating and cooling and for reasonable variations or inaccuracies of the parts.

However, in other instances it is desirable to provide a clamp which will limit the axial movement of the sections away from each other. A clamp of this kind is illustrated in Figs. 4 and 5 and at 15 in Fig. 1.

The clamp is somewhat similar to that described and similar parts bear similar reference numerals. Instead of the circumferential corrugations 22 and 23, corrugations 40 and 41 are provided adjacent either end of the split clamping member 21 and its liner 24.

The ends of the parts 42 to be coupled together are provided with circumferential beads 43. The sections 42 may thus have axial movement in relation to each other and a limited amount of angular movement but they cannot pull apart or be separated unless the clamp is opened. This clamp is applicable to joining sections that are not supported at their opposite ends, such as sections of the manifold collector ring or for the outlet pipe of the manifold.

In connection with this form of the invention there is shown an adjusting means for the locking device to permit the clamp being used on pipes of somewhat varying diameters. Obviously, if desired, this adjusting means might also be used on the clamp 13.

The hinge 45 for the locking ring 30 instead of being secured to the split clamping member is mounted on one end of a threaded stud 46. The stud in turn is threaded into a cross head 47 having trunnions 48 pivotally mounted in the ears 49 of a plate 50 welded or otherwise secured to the split clamping member. Thus if the sections are of greater or less diameter the position of the hinge 40 may be accordingly adjusted. Other parts of the clamp being similar a further description is not necessary.

Such changes in details of construction and arrangements of parts as would occur to one skilled in the art are to be considered as coming within the spirit of the invention as set forth in the appended claims.

I claim:

1. A joint for an exhaust manifold, said joint comprising a split clamping member surrounding the ends of a pair of members of said exhaust manifold, circumferential corrugations in said split clamping member, said corrugations engaging the end of one or both of said pair of members of said exhaust manifold so as to provide for axial and angular movement thereof, and means for firmly securing the ends of said split clamping member together, said means providing for diametrical expansion and contraction of said split clamping member.

2. A joint for an exhaust manifold, said joint comprising a split clamping member surrounding the ends of pair members of said exhaust manifold, a liner for said split clamping member, the opening in said liner being circumferentially spaced away from the opening in said split clamping member, circumferential corrugations in said split clamping member and identical corrugations in said liner, said corrugations engaging the end of one or both of said pair of members of said exhaust manifold so as to provide for axial and angular movement thereof, and means for firmly securing the ends of said split clamping member together, said means providing for diametrical expansion and contraction of said split clamping member and its liner.

3. A joint for an exhaust manifold, said joint comprising a split clamping member surrounding the ends of a pair of members of said exhaust manifold, circumferential corrugations in said split clamping member, one of said corrugations engaging the end of one of said pair of members of said exhaust manifold so as to provide for axial and angular movement thereof, another of said corrugations being positioned between the ends of said pair of members of said exhaust manifold, and means for firmly securing the ends of said split clamping member together, said means providing for diametrical expansion and contraction of said split clamping member.

4. A joint for an exhaust manifold, said joint comprising a split clamping member surrounding the ends of a pair of members of said exhaust manifold, circumferential corrugations in said split clamping member, circumferential beads on the ends of said pair of members of said exhaust manifold, said corrugations engaging the ends of said pair of members of said exhaust manifold so as to provide for axial and angular movement thereof, and the engagement of said beads and corrugations preventing the separation of said pair of members of said exhaust manifold, and means for firmly securing the ends of said split clamping member together, said means providing for diametrical expansion and contraction of said split clamping member.

5. A joint for an exhaust manifold, said joint comprising a split clamping member surrounding the ends of pair members of said exhaust manifold, a liner for said split clamping member, the opening in said liner being circumferentially spaced away from the opening in said split clamping member, circumferential corrugations in said split clamping member and identical corrugations in said liner, circumferential beads on the ends of said pair of members of said exhaust manifold, said corrugations engaging the ends of said pair of members of said exhaust manifold so as to provide for axial and angular movement thereof and the engagement of said beads and corrugations preventing the separation of said pair of members of said exhaust manifold, and means for firmly securing the ends of said split clamping member together, said means providing for diametrical expansion and contraction of said split clamping member, and its liner.

6. A joint for an exhaust manifold, said joint comprising a split clamping member surrounding the ends of a pair of members of said exhaust manifold, said split clamping member providing for axial movement of said pair of members and angular movement of at least one of said pair of members, and means for firmly securing the ends of said split clamping member together, said means providing for diametrical expansion and contraction of said split clamping member, and comprising a resilient ring-like locking member hinged adjacent the opening in said split clamping member, said locking member engaging a locking lug on the other side of said opening in said split clamping member.

7. A joint for an exhaust manifold, said joint comprising a split clamping member surrounding the ends of a pair of members of said exhaust manifold, circumferential corrugations in said split clamping member, said corrugations engaging the end of one or both of said pair of members of said exhaust manifold so as to provide for axial and angular movement thereof, and means for firmly securing the ends of said split clamping member together, said means providing for diametrical expansion and contraction of said split clamping member, and comprising a resilient ring-like locking member hinged adjacent the opening in said split clamping member, said locking member engaging a locking lug on the other side of said opening in said split clamping member.

8. A joint for an exhaust manifold, said joint comprising a split clamping member surrounding the ends of a pair of members of said exhaust manifold, circumferential corrugations in said split clamping member, said corrugations engaging the end of one or both of said pair of members of said exhaust manifold so as to provide for axial and angular movement thereof, and means for firmly securing the ends of said split clamping member together, said means providing for diametrical expansion and contraction of said split clamping member, and comprising a resilient ring-like locking member positioned on one side of the opening in said split clamping member, a hinge for said locking member, means for adjusting the position of said hinge to compensate for varying diameters of said pair of members of said exhaust manifold, said locking member engaging a locking lug on the other side of said opening in said split clamping member.

9. A joint for an exhaust manifold, said joint comprising a split clamping member surrounding the ends of pair members of said exhaust manifold, a liner for said split clamping member, the opening in said liner being circumferentially spaced away from the opening in said split clamping member, circumferential corrugations in said split clamping member and identical corrugations in said liner, circumferential beads on the ends of said pair of members of said exhaust manifold, said corrugations engaging the ends of said pair of members of said exhaust manifold so as to provide for axial and angular movement thereof and the engagement of said beads and corrugations preventing the separation of said pair of members of said exhaust manifold, and means for firmly securing the ends of said split clamping member together, said means providing for diametrical expansion and contraction of said split clamping member and its liner, and comprising a resilient ring-like locking member positioned on one side of the opening in said split clamping member, a hinge for said locking member, means for adjusting the position of said hinge to compensate for varying diameters of said pair of members of said exhaust manifold, said locking member engaging a locking lug on the other side of said opening in said split clamping member.

ROSCOE I. MARKEY.